May 28, 1963 A. H. NORÉN 3,091,667

INTERCOMMUNICATION SYSTEM

Filed Nov. 30, 1959 2 Sheets-Sheet 1

FIG I

INVENTOR,
August Helge Norén by Wenderoth, Lind and Ponack
Attorneys

May 28, 1963 A. H. NORÉN 3,091,667

INTERCOMMUNICATION SYSTEM

Filed Nov. 30, 1959 2 Sheets-Sheet 2

INVENTOR,

August Helge Norén by Wenderoth, Lind and Ponack

Attorneys

United States Patent Office 3,091,667

Patented May 28, 1963

3,091,667

INTERCOMMUNICATION SYSTEM

August Helge Norén, Sollentuna, Sweden, assignor to Aktiebolaget Gylling & Co., Stockholm-Grondal, Sweden Filed Nov. 30, 1959, Ser. No. 856,215
Claims priority, application Sweden Dec. 9, 1958
4 Claims. (Cl. 179—40)

Figure 1:
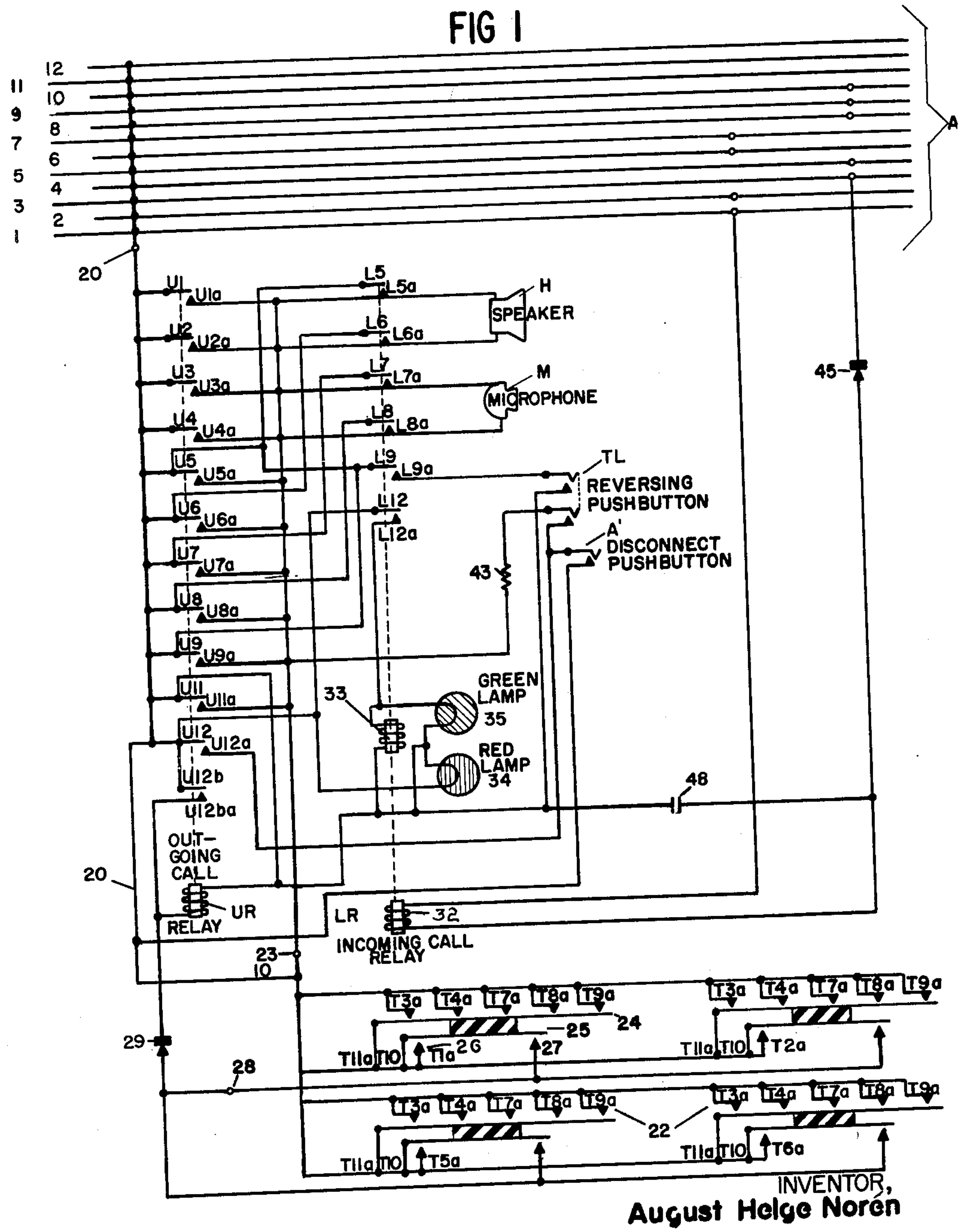

Some intercommunication system, such as push-button operated telephone systems, are equipped with decentralized connecting means, which means that the relays which are adapted to connect the different stations to a common communication channel, are located at the stations instead of being assembled in a common exchange. In such systems the installation usually comprises a multiconductor cable which connects the stations to each other and to a central station, the latter comprising a common amplifier, a current supply source, and a number of relays for control functions.

In such systems, the multiconductor cable usually contains a number of conductors for the transmission of speech, a number of conductors for conducting the actuating current from one or the other of two conversing stations to the relays in the central station, and a great number of calling-up conductors, usually one for each station in the system. The common multiconductor cable, therefore, comprises a great number of conductors. Partly for this reason and partly because the mode of connection of the stations to the common cable is somewhat different for different stations, the installation of a system of this kind is rather complicated and requires special skill. Further, the many conductors in the common cable and the great number of connections which must be made to each station, means that the stations cannot be connected to the common cable by means of plugs and sockets at a reasonable price but have to be connected by soldering. This renders the service more difficult.

In order to avoid these difficulties, it has already been proposed to provide an intercommunication system with only two conductors interconnecting the whole system. According to these suggestions each station is provided with an individual amplifier, and in addition to that, a number of amplifier tubes and relays for the operation. The stations in such a system are rather complicated and expensive, and also less reliable.

In the intercommunication system according to the present invention the number of conductors in the common cable is greatly reduced without introducing any appreciable complication of the apparatus in the system.

The present invention relates to an arrangement in intercommunication system, especially of the quick-telephone type, with decentralized connecting means and one or more centrally located amplifiers, said connecting means comprising at least one incoming call relay at each station in the system, each of said relays being adapted to be actuated when the corresponding station is called-up, and by such actuation to connect the sound transducing means of the station to pairs of conductors which are extended through all stations in the system and to which the input and output terminals of the amplifier are connected. The invention is mainly characterized in that the actuation windings of at least part of a plurality of said incoming call relays are permanently connected between two conductors in a common multiconductor cable which connect all of the stations to each other, wherein at least one of said conductors is a conductor adapted during conversation to carry speech signal current and is connected to one of the input or output terminals of the amplifier, and wherein a blocking impedance is connected in series between said actuation winding and said conductor, said blocking impedance being adapted to block the voltage of speech signal frequency appearing in said conductor but to provide a passage for the actuation current to said relay.

Figure 2:
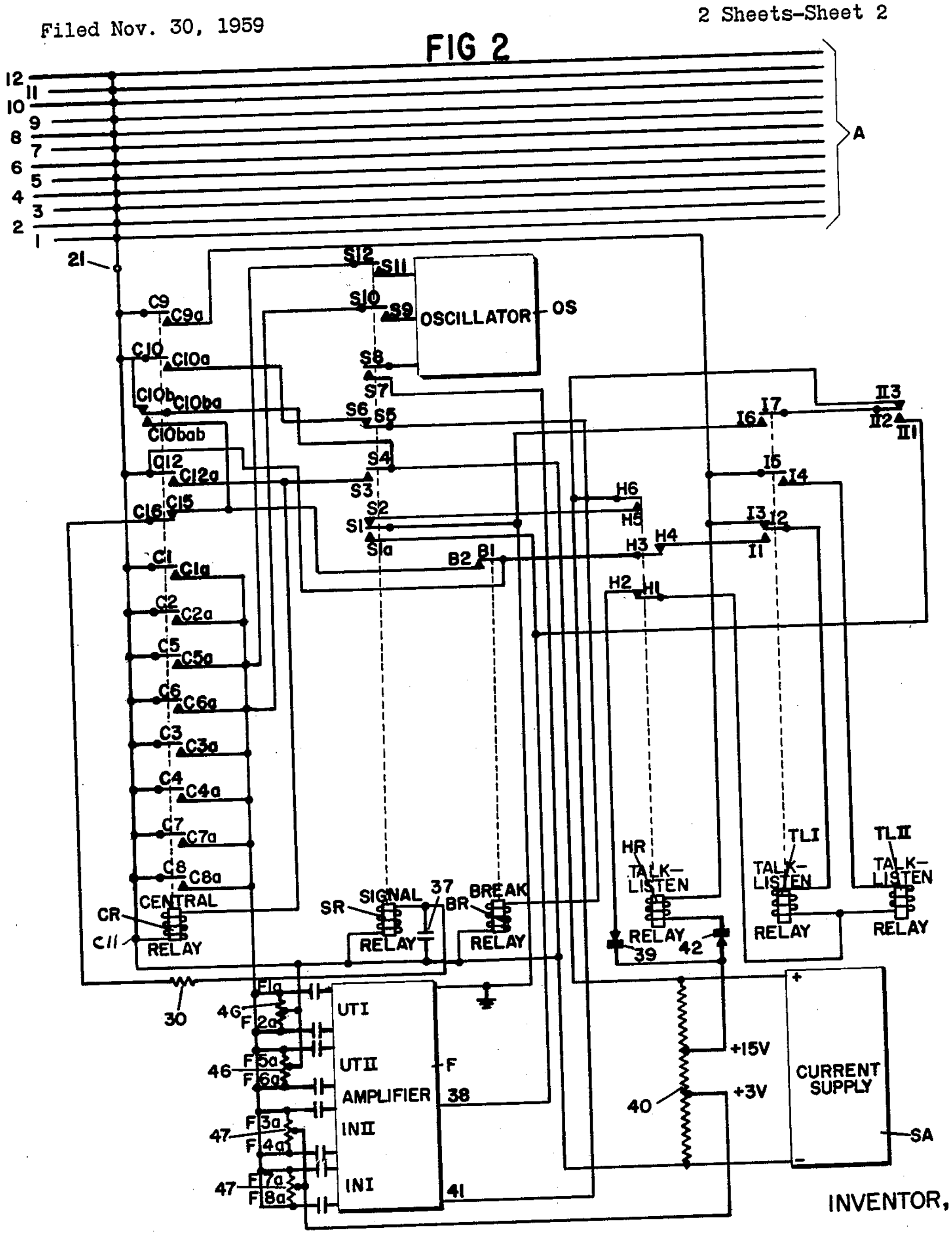

The invention will now be more fully described with reference to the accompanying drawings, of which FIG. 1 is a diagram for an individual telephone station according to the invention and FIG. 2 is a diagram of a central station adapted to be used together with a plurality of stations according to FIG. 1.

In the drawings, A designates twelve conductors 1–12 of a multiconductor cable which interconnects all the stations of an intercommunication system and the central station for such system. The telephone station according to FIG. 1 comprises a loudspeaker H and a microphone M. An outgoing call relay UR having contacts U1—U1*a*, U2—U2*a* . . . U12—U12*a*, U12*b*—U12*ba* is adapted to connect the microphone M and the loudspeaker H to speech conductors in the cable A when a call is made from the station. Correspondingly, an incoming call relay LR having contacts L5, L5*a*, L6, L6*a* . . . L9, L9*a*, and L12, L12*a* is adapted to connect the loudspeaker and the microphone to speech conductors in said cable A, when the station receives a call.

The station is further provided with a set of twenty pushbuttons 22 in groups of five connected by conductors T3*a*, T4*a*, T7*a*, T8*a* or T9*a* of multiconductor cable 23 to respective relay contacts U3*a*, U4*a*, U7*a*, U8*a* and U9*a*. These pushbuttons are adapted to be used for calling up other stations. A contact bar 24 common to all five pushbuttons in each group is connected by conductor T11*a* of the multiconductor cable 23 to contact U11*a*. A second contact bar 25 is mechanically connected to the bar 24 by an insulator, and contact bar 25 is connected by conductor T10*a* of the multiconductor cables 23 and 20 to the conductor 10 of cable A. Contact bar 25 is adapted to contact two fixed contacts 26 and 27. Contacts 26 in the first group of pushbuttons is connected by conductor T1*a* of multiconductor cable 23 to relay contact U1*a*, while contact 27 in each group is connected by conductor 28 through rectifier 29 to one end of the energizing coil for outgoing call relay UR. Contact 26 in the second group is connected by conductor T2*a* of multiconductor cable 23 to relay contact U2*a*, contact 26 in the third group is connected by conductor T5*a* to relay contact U5*a*, and contact 26 in the fourth group is connected by conductor T6*a* of multiconductor cable 23 to relay contact U6*a*. There is also a pushbutton TL adapted to compulsorily reverse the speech direction through the amplifier, and a pushbutton A[1] for disconnecting the connection of the station to cable A when a conversation has come to an end.

The central station according to FIG. 2 comprises an amplifier F with two input channels INI and INII and two output channels UTI and UTII enabling a double-sided conversation. Further, there is a current supply unit SA having a voltage divider 40 and a transistorized tone generator OS, adapted to generate the call signal tone. The central station further comprises six relays. Relay CR has relay contacts C1—C1*a*, C2—C2*a* . . . C10—C10*a*, C10*b*—C10*a* and C10*bab*, C12—C12*a* and C15—16, which contacts are normally in the positions shown. Signal relay SR has relay contacts S1, S1*a*, S2, S3—S4, S5—S6, S7—S8, S9—S10, and S11—S12. Break relay BR has only contacts B1—B2, while auxiliary relay HR has contacts H1—H2, H3—H4, and H5—H6. Talk-listen relay TLI has contacts I1, I2, I3 and I4—I5, and 16—17, while talk-listen relay TLII has contacts II1, II2 and II3. The relay contacts are normally in the position shown and are connected to each other as shown. Contacts C1*a* and C2*a* are connected by conductors F1*a* and F2*a* to output UTI of amplifier F, which conductors have a voltage divider 46 connected across them. Contacts C3a and C4a are similarly connected to conductors F3a and F4a of the input IMII of amplifier F and have a voltage divider 47 connected across them. Contacts C5a and C6a are connected through conductors F5a and F6a to output UTII of the amplifier F, and have a voltage divided 46 connected across them, while contacts C7a and C8a are connected by conductors F7a and F8a to the input INI of the amplifier F, and have voltage divider connected across them.

The different conductors of the multiconductor cable have been designated with digits from 1 to 12. By means of a multiconductor cable 20 those conductors are connected to the respective contacts U1–U12 of the outgoing call relay UR in the station shown in FIG. 1. Thus, the conductor 3 of the cable A is connected to the contact U3 of the outgoing call relay UR, while the contact U3a is adapted to cooperate with said contact U3.

In the central station of FIG. 2, there is a multiconductor cable 21 connecting the respective conductors of the cable A to respective contacts C1–C12 of the central relay CR.

The connections of the parts of the system will be apparent from the following description of its operation:

When no conversation is going on in the system, the different relays will be in the condition shown in the drawings. The conductor 11 of the cable A is permanently connected to the negative side of the current supply unit SA by conductor C11 in multiconductor cable 21. The conductor 10 in the cable A is connected to the positive side of said current supply unit through the relay contacts C10b and C10a. The rest of the conductors in the cable A are disconnected from the central station according to FIG. 2, by the contacts of the relay CR, which has not yet been energized.

If a call is made from the station according to FIG. 1 by pressing for example contact 7a of the first group of pushbuttons 22, the contact 7a of said pushbutton, which is connected to the relay contact U7a through the multiconductor cable 23, will first come into contact with contact rod 24. The contact rod will connect U7a to a conductor T11a and in turn to the relay contact U11a through the multiconductor cable 23.

Depressing the pushbutton 22 also causes the contact rod 25 to make contact with the fixed contacts 26 and 27, which connects conductor 10 through conductor T10 and contact bar 25 to one end of the magnetization winding of the relay UR through the conductor 28 and a rectifier 29. The other end of the said winding is directly connected to the conductor 11 in the cable A through contact U11.

Because the conductor 10 is connected to the positive pole and the conductor 11 is connected to the negative pole of current supply unit, the relay UR will not be actuated. Thereby the contacts U12b and U12ba will close and positive voltage will be transmitted through the conductor 28 to the conductor 12 in the cable A. As a first consequence of that, the relay SR in the central station will be actuated through the following circuit: Conductor 12, relay contact C12, relay contacts B1—B2, C15—C16, a resistor 30, the winding of relay SR, and the negative side of current supply SA. When the relay SR is actuated, the contacts S3 and S4 will close. The relay CR will then be energized through the following circuit: Positive side of the current supply unit SA, the relay contacts S4 and S3, the winding of relay CR negative side of current supply SA. When the relay CR is actuated, its contacts C10ba will switch from contact C10b to contact C10bab. That means that the conductor 10 in the cable A will be disconnected from the current supply and the conductor 12 will be connected to the positive side of the current supply through the following circuit: S4, C10ba, C10bab, B2, B1, the conductor 12. The relay CR will be retained in the energized condition by current from the conductor 12 through the contacts C12 and C12a.

Before the relay CR in the central station is actuated, the incoming call relay LR in the called station will be actuated. By depressing the pushbutton 22 in the calling station, the conductor 7 in the cable A will be connected to the negative side of current supply SA through the following circuit: The conductor 11 in said cable, relay contacts U11, U11a, which are closed by energization of outgoing call relay UR, the contact rod 24, the uppermost contact of the pushbutton 22, relay contacts U7a and U7, the conductor 7. Further, the conductor 1 in the cable A will be connected to the positive side of the current supply through the following current path: The conductor 10, the contact rod 25, the contact 26, the relay contacts U1a, U1, the conductor 1. It will now be presumed, that the incoming call relay LR of the called station has its action winding 32 connected between the conductors 1 and 7 in the cable A in the same way the station according to FIG. 1 has its incoming call relay LR connected between the conductors 1 and 3.

In addition to an actuation winding 32, each incoming call relay LR is provided with a holding winding 33. When the incoming call relay has been actuated its holding winding 33 will be connected between the conductors 11 and 12 of the cable A through the contacts L12a and L12 of the relay. When the incoming call relay has been actuated, it will therefore remain in the actuated condition even after the conductor has been disconnected from the current supply. The incoming call relays LR are of the quick-action type and, therefore, they will be actuated before actuation of the relay CR in the central station occurs and the conductor 10 is disconnected.

The outgoing call relay UR in the calling station is retained in the actuated condition by current from the conductor 12 through the relay contacts U12b and U12ba.

When the relay CR in the central unit is actuated, the conductors 1 and 2 in the common cable A are connected to the output terminals UTI of the amplifier F through contacts C1, C1a and F1a, and C2, C2a and F2a. Similarly, the conductors 3 and 4 are connected to the input terminals INII, the conductors 5 and 6 to the output terminals UTII and the conductors 7 and 8 to the input terminals INI.

When the outgoing call relay UR in the calling station is actuated, the loudspeaker H is connected to the conductors 1 and 2 in the cable A, and, consequently, to the output terminals UTI of the amplifier F. In a similar way, the microphone M of the calling station will be connected to the conductors 3 and 4 and, consequently, to the input terminals INII of the amplifier F. When the incoming call relay LR in the called station is actuated, the loudspeaker H of that station will be connected to the conductors 5 and 6, and consequently, to the output terminals UTII of the amplifier F. Similarly, the microphone M of the called station will be connected to the conductors 7 and 8 and, consequently, to the input terminals INI of the amplifier F. This means, that the calling and the called station now are connected for a two-way conversation.

A red lamp 34, which is connected between the conductors 11 and 12 of the cable A is now lighted in every station of the system, indicating that the system is in use. A green lamp 35, connected in shunt to the holding winding of the incoming call relay LR, is lighted only at the called station and indicates that a call has been received.

An oscillator or tone generator OS is included in the central station according to FIG. 2. During the period when the signal relay SR is actuated, said oscillator is connected to the current supply source by means of the relay contacts S7 and S8. The oscillator OS is assumed to be transistorized, so that the oscillations will start immediately when the current supply has been connected to it. The output terminals of the oscillator are connected to the relay contacts S9 and S11, which in turn cooperate with the relay contacts S10 and S12. The last mentioned contacts are directly connected to the input terminals INII of the amplifier F, and the tone generated by the oscillator will thus be reproduced in the loudspeaker H of the called station.

The call signal tone will be of a certain duration independent of how long a time the pushbutton 22 at the calling station is depressed, because the signal relay SR is delayed in its action by means of a series resistor 30 and a shunt capacitor 37. The delay occurs during actuation as during demagnitization. As soon as the central relay CR has been actuated, the actuation current to the relay SR will be interrupted by the contacts C15 and C16. Because the relay SR has a delayed action, it will be actuated for a predetermined time, during which the call signal is transmitted to the called station.

It is of importance, that the relay SR is delayed during actuation, because the incoming call relay LR of the called station must be actuated before the central relay CR in the central station is actuated.

During the time, when the signal relay SR is energized, a conductor 38 coming from the amplifier F is connected to ground through the contacts S1*a* and S1. The arrangement of the amplifier F is such, that when that conductor is grounded, the transmission channel from the input INII to the output UTII is clear and the channel from the input INI to the output UTII is blocked. By means of this arrangement it will be certain that the call signal is reproduced at the called station independent of all other factors.

Each station is provided with a reversing pushbutton TL. By means of that button the direction of speech can be reversed from the calling station as well as from the called station. If that button is depressed at the calling station a positive voltage will be supplied from the conductor 12 through the relay contacts U12 and U12*a* and the lowermost make contacts of the pushbutton TL and further through the resistor 43 and relay contacts U9*a* and U9 to the conductor 9 in the cable A. Thereby, the relay TLI in the central unit will be actuated through the following circuit: the conductor 9, relay contacts C9, C9*a*, I3, I2, the winding of the relay TLI, relay contacts H1, H2, a rectifier 39, the voltage divider 40, and the respective side of current supply SA. After it is energized, the relay TLI will be supplied with holding current from the conductor 12 through the relay contacts C12, H3, H4, I1 and I2. The relay TLI will therefore remain in the energized condition even when the pushbutton TL has been released. As long as the pushbutton TL is kept depressed, the relay TLII in the central station will also be energized through the following circuit: the conductor 9, which, as has already been described, is connected to the positive side of the current supply SA, C9, C9*a*, I5, I4, the winding of the relay TLII, relay contacts H1, H2, the rectifier 39, the voltage divider 40, the negative side of current supply SA. The relay TLII will remain energized only as long as the pushbutton TL is depressed, and return to the deenergized condition when that button is released. Because the relay TLI is actuated, the relay contact II2 is connected to ground through the relay contacts I6 and I7.

In addition to the already described conductor 38, there is another conductor 41 coming from the amplifier, the grounding of which brings about the clearing of the amplifier channel I from the input terminals INI to the output terminals UTI and blocking of the opposite channel II. When the relay TLII is deenergized, i.e. when the pushbutton TL at the calling station has been released after having been depressed, the conductor 41 is connected to ground through the relay contacts II2 and II3, When the relay TLII is actuated, i.e. when the pushbutton TL at the calling station is depressed, the conductor 38 will be connected to ground through the relay contacts II1 and II2. Therefore, the channels I and II of the amplifier will be alternately clear and blocked by depressing and releasing the pushbutton TL at the calling station.

If the pushbutton TL at the called station is depressed, a negative voltage will be supplied from the conductor 11 in the cable A to the conductor 9 through the uppermost make contact of the pushbutton TL and the relay contacts L9*a* and L9. Thereby, the relay HR in the central station will be actuated through the following circuit: The conductor 9, relay contacts C9, C9*a*, the winding of relay HR, a rectifier 42, the voltage divider 40, and the positive side of current supply SA. By the actuation of the relay HR the relays TLI and TLII will be deenergized, if they are energized. Further, the conductor 41 will be connected to ground through the relay contacts H5, H6, S2 and S1. The transmission will therefore be possible only from the called to the calling station, independent of whether the pushbutton TL at the calling station is depressed or not.

The resistor 43, preferably of the iron-hydrogen type, is connected in series with one contact spring of the pushbutton TL as a protective resistor. The reason for this arrangement is to prevent a shortcircuit between the positive and the negative poles of the current supply unit SA, if it should happen that the pushbuttons TL at both the calling and the called stations are depressed simultaneously.

When the conversation is finished, the system is disconnected by depressing the pushbutton A[1] at the calling station. Thereby a positive voltage will be supplied from the relay contact U12*a* to the conductor 10 in the cable A. Thereby, the relay BR in the central unit will be energized through the following circuit: the conductor 10, relay contacts C10, C10*a*, S6, S5, the winding of the relay BR, the negative side of current supply SA. When the relay BR is acuated, the contacts B1 and B2 will open and, therefore, the relay CR will be deenergized, because the connection of relay CR to the positive side of the current supply SA through C12*a*, C12, B1, B2, C10*bab*, 10*ba* and S4 is broken. As has been already described, the outgoing call relay UR as well as the incoming call relay LR are supplied with holding current from the conductor 12, and, therefore, these relays will also be deenergized. Similarly, the relay TLI will be deenergized, if it happens to be energized. The whole system is, therefore, returned to its rest condition.

As shown in the drawings, the incoming call relay LR in the station according to FIG. 1, is provided with two windings 32 and 33, of which the winding 32 is the actuation winding and the winding 33 is the holding winding. As shown, the actuating winding 32 is connected between the conductor 1 of the common cable A, said conductor 1 being an output conductor, i.e. one of the conductors which are connected to the output terminals of the amplifier F, and the conductor 3 in the same cable, said conductor 3 being an input conductor, i.e. one of the conductors, which are connected to the input terminals of the amplifier A. In the preceding description of the functioning of the system, it was assumed that the incoming call relay of the called station was connected between the conductors 1 and 7. One end of the actuation winding of an incoming call relay may be connected to any one of the conductors 1, 2, 5 or 6, which has been indicated in the drawing by small rings around said conductors. The other end of the actuation winding may be connected to any one of the conductors 3, 4, 7, 8 or 9, which, in a similar way, has been indicated by small rings round these conductors.

Of the last mentioned conductors, only the conductors 3, 4, 7 and 8 are input conductors, i.e. conductors connected to the input terminals of the amplifier. The conductor 9 is an auxiliary conductor which is provided in order to get an even number of conductors in the common cable and which is utilized for enabling a greater number of stations to be connected to the system.

As will be apparent from the foregoing, the conductor 9 is also utilized for control functions.

As the incoming call relays may be connected arbitrarily between the said conductors, four times five, i.e. twenty stations, may be included in the telephone system. For adding more stations to the system, one or more conductors must be added to common cable A. If one conductor is added to the conductors in the cable A, four or five further sets can be connected to the system, depending on to which group of conductors in the cable the new conductor belongs.

As shown in the drawings, one end of the actuating winding 32 of the incoming call relay is connected to one of the output conductors. Due to the fact that the speech current circuits in a system of this kind have a rather low impedance, that the relay winding has a relatively high impedance, and that the outputs of the amplifier are rather insensitive to static, this connection may be made directly. In series between the other end of the actuation winding and the input conductor in the cable A to which such winding is connected, there is a germanium diode 45. During conversation, the input conductors have a very low signal voltage, on the order of one millivolt or less, and for such voltages the germanium diode acts as an insulator. In this case, however, voltages from the output conductor, to which the other end of the actuation winding is connected, may be transferred through the winding, mainly because of the inherent capacitance of such winding, to the said input conductor. This voltage can be sufficiently high to overcome the voltage threshold of the germanium diode. For that reason, a capacitor 48 is connected between the conductor 11 in the common cable A and the joint between the germanium diode 45 and the actuation winding 32. By means of that capacitor, the disturbance voltages which may penetrate through the actuation winding 32, are carried away.

The insulating properties of the germanium diode 45 may be very much improved if a suitable small D.C. voltage is applied to the diode in its non-conducting direction. With this object in view, all the output conductors of the amplifier F are connected to the negative side of the current supply unit SA through voltage dividers 46, while all input conductors are connected to a point of the voltage divider 40 which has a potential of about three volts. This connection is made through voltage dividers 47. The conductor 9, which in this connection is comparable to the input conductors, is connected through the relay winding HR, the rectifier 42 and the relay contacts C9a and C9 to a point on the voltage divider 40 which has a voltage of about plus fifteen volts.

It is possible to substitute for the germanium diode another impedance, which is sufficiently high to act as an insulator as compared to the relatively low impedance of the input circuits. A resistor of sufficiently high value, for example of the order of 5000 ohms, may be used for this purpose. Such impedance must, however, be connected in series with a rectifier, because otherwise there would be a risk that more than one incoming call relay may be actuated when a call is made. A drawback with this arrangement is, however, that the actuating current for the incoming call relay will be very much decreased.

There are also other types of blocking impedances which may be used. Thus, it may be possible to substitute for the diode a resistor of the silica carbide type, which has a very high impedance for low voltages but low impedance for higher voltages to which it is exposed to during a call process. Also in that case it is necessary to connect a rectifier in series with the impedance.

Although in the preceding specification, the invention has been described with reference to a specific embodiment of the same, there will be a great number of variants within the scope of the invention.

I claim:

1. In an intercommunication system, a plurality of individual telephone stations, a central station, a common multiconductor cable interconnecting said individual stations and said central station, an amplifier in said central station, a D.C. current supply, said amplifier having a first and a second channel, each of said channels having two input terminals and two output terminals, means connecting each of said input terminals of said first channel to an individual conductor in said cable, said conductors forming together a first group of conductors, means connecting each of said input terminals of said second channel to an individual conductor in said cable, said conductors forming together a second group of conductors, said first and second groups forming together a first main group of conductors, means connecting each of said output terminals of said first channel to an individual conductor in said cable, said conductors forming together a third group of conductors, means connecting each of said output terminals of said second channel to an individual conductor of said cable, said conductors forming together a fourth group of conductors, said third and fourth group forming together a second main group of conductors, a microphone and a loudspeaker in each individual station, an incoming call relay and an outgoing call relay in each individual station, said incoming call relay, when actuated, connecting said microphone to said first group of conductors in the cable and said loudspeaker to said fourth group of conductors of said cable, said outgoing call relay, when actuated, connecting said microphone to said second group of conductors in said cable and said loudspeaker to said third group of conductors of said cable, call means in each individual station for initiating calls to other stations, said call means, when actuated, connecting the coil of said outgoing call relay to the poles of said current supply and connecting one conductor of said first main group of conductors to one pole of said current supply and connecting one conductor of said second main group of conductors to the other pole of said current supply, said incoming call relay having a magnetizing winding permanently connected between one conductor of said first main group and one conductor of said second main group, and a blocking impedance connected in series between said magnetizing coil of said incoming call relay and said conductor of said first main group, said blocking impedance being a rectifier having a resistance in its conductive direction which is high for small voltages, such as the speech voltage of the conductor to which the blocking impedance is connected, and low for high voltages, such as the actuating voltage of said incoming call relay.

2. An intercommunication system as claimed in claim 1, wherein said blocking impedance is a germanium crystal rectifier.

3. An intercommunication system as claimed in claim 1, further comprising contact means connecting all the conductors of said first main group to one pole of said current supply and all conductors of said second main group to the other pole of said current supply, means for actuating said contact means when the calling means in a station is actuated, said current supply being connected with a polarity such that upon actuation of said contact means, said blocking impedances connected in series with said magnetizing coils of said incoming call relays are supplied with a D.C.-voltage in their nonconductive direction.

4. An intercommunication system as claimed in claim 1 further comprising a shunt impedance in the form of a capacitor in each individual station, said shunt impedance being connected from the junction between the magnetizing coil of said incoming call relay and said blocking impedance to a conductor in said multiconductor cable which has fixed potential.

References Cited in the file of this patent

UNITED STATES PATENTS

| | | |
|---|---|---|
| 2,186,242 | Halligan | Jan. 9, 1940 |
| 2,871,303 | Riva | Jan. 27, 1959 |

FOREIGN PATENTS

| | | |
|---|---|---|
| 166,175 | Sweden | Feb. 10, 1959 |